DAVID A. RITCHIE.
Improvement in Tubes.
No. 124,011. Patented Feb. 27, 1872.
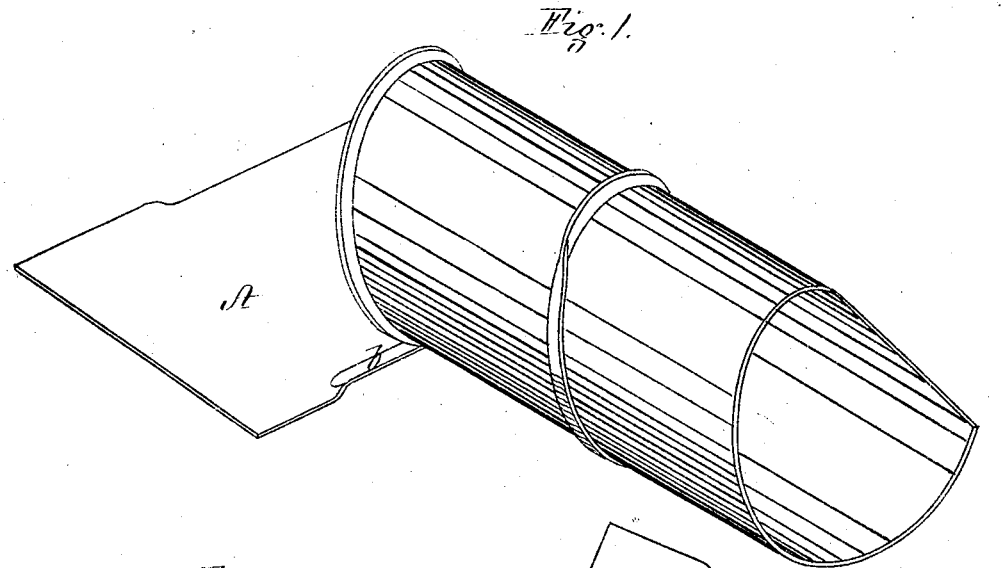
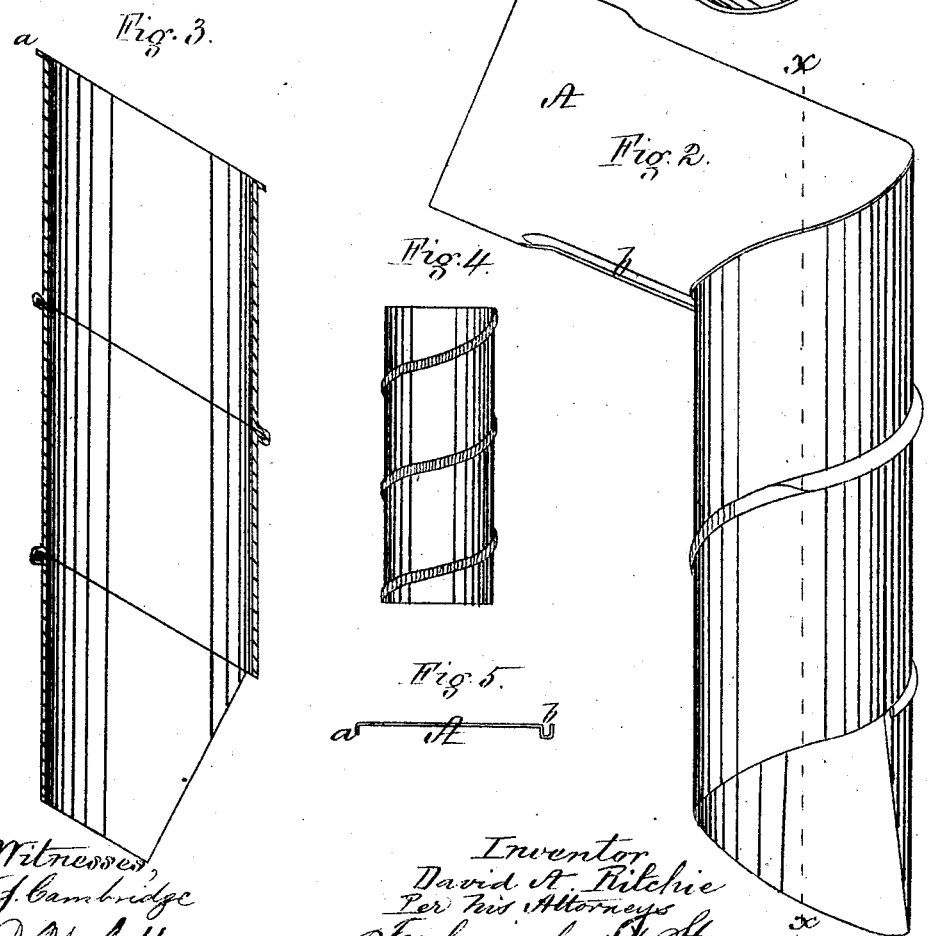

124,011

UNITED STATES PATENT OFFICE.

DAVID A. RITCHIE, OF CHARLESTOWN, MASSACHUSETTS.

IMPROVEMENT IN TUBES.

Specification forming part of Letters Patent No. 124,011, dated February 27, 1872.

*To all whom it may concern:*

Be it known that I, DAVID A. RITCHIE, of Charlestown, in the county of Middlesex and State of Massachusetts, have invented an Improved Pipe or Tube, of which the following is a full, clear, and exact description, reference being had to the accompanying drawing making part of this specification, in which—

Figure 1 is a perspective view, representing the different stages in the construction of my improved pipe. Fig. 2 is an elevation of the same. Fig. 3 is a section on the line $x\ x$ of Fig. 2. Fig. 4 represents a piece of my improved pipe finished; Fig. 5, detail to be referred to.

My invention consists in a pipe or tube made by spirally winding a strip of metal and uniting its edges by a grooved or flanged seam or joint, a pipe or tube so produced being cheaper and possessing greater stiffness and strength than one of the same thickness of metal, as heretofore made.

To enable others skilled in the art to understand and use my invention, I will proceed to describe the manner in which I have carried it out.

In the said drawing, A is a flat strip of sheet metal of the required width, which, as it is fed through a machine, (to form the subject of a future application,) is spirally wound around a mandrel or "former," one edge of the strip being turned down to form a flange or tongue, $a$, while the other edge is turned up and provided with a groove or channel, $b$, (see Figs. 1 and 5,) the tongue being directed and laid into the groove, as seen in Fig. 3. A pressure-roller or other device now bears on the outside of the raised joint thus produced, whereby it is flattened down, the joint being formed of four thicknesses of metal. The joint is now acted on by a milling-roll, which gives it a neat and ornamental finish, but the operation of milling may be dispensed with, if desired. The pipe or tube may be made of any suitable length, and may be galvanized or tinned to render the seam perfectly tight, if required. From the foregoing it will be seen that the spiral seam, extending from one end of the pipe to the other, serves to impart additional stiffness and strength thereto, the inside of the joint being smoothly finished, so as to offer no obstruction.

My improved pipe is particularly applicable for conductors and speaking-tubes for houses, but may be used for a variety of other purposes.

Claim.

What I claim as my invention, and desire to secure by Letters Patent as a new article of manufacture, is—

A pipe or tube made by spirally winding a strip of metal and uniting its edges by a grooved or flanged seam or joint, substantially as described.

Witness my hand this 13th day of January, A. D. 1872.

DAVID A. RITCHIE.

In presence of—
N. W. STEARNS,
W. J. CAMBRIDGE.